(12) United States Patent
Shim et al.

(10) Patent No.: US 9,971,145 B2
(45) Date of Patent: May 15, 2018

(54) MIRROR DISPLAY AND METHOD OF MANUFACTURING THE SAME

(71) Applicant: SAMSUNG ELECTRONICS CO., LTD., Suwon-si (KR)

(72) Inventors: Dongsik Shim, Hwaseong-si (KR); Hongseok Lee, Seongnam-si (KR); Seogwoo Hong, Yongin-si (KR); Joonyong Park, Suwon-si (KR)

(73) Assignee: SAMSUNG ELECTRONICS CO., LTD., Suwon-Si (KR)

(*) Notice: Subject to any disclaimer, the term of this patent is extended or adjusted under 35 U.S.C. 154(b) by 0 days. days.

(21) Appl. No.: 15/220,930

(22) Filed: Jul. 27, 2016

(65) Prior Publication Data

US 2017/0082850 A1 Mar. 23, 2017

(30) Foreign Application Priority Data

Sep. 23, 2015 (KR) .......................... 10-2015-0134817

(51) Int. Cl.
*G02B 26/02* (2006.01)
*G02B 26/04* (2006.01)
*G09G 3/34* (2006.01)
*F21V 8/00* (2006.01)

(52) U.S. Cl.
CPC .......... *G02B 26/04* (2013.01); *G02B 6/0051* (2013.01); *G02B 6/0068* (2013.01); *G09G 3/3413* (2013.01); *G09G 3/3473* (2013.01)

(58) Field of Classification Search
CPC .. G02B 6/0051; G02B 6/0055; G02B 6/0068; G02B 26/02; G02B 26/04; G02B 26/08; G02B 26/005; G02B 5/10; G09G 3/3413; G09G 3/3473
USPC .......................................................... 359/233
See application file for complete search history.

(56) References Cited

U.S. PATENT DOCUMENTS

| | | | |
|---|---|---|---|
| 7,495,719 B2 | 2/2009 | Adachi et al. | |
| 7,746,529 B2 | 6/2010 | Hagood et al. | |
| 9,164,278 B2 | 10/2015 | Shim et al. | |
| 2006/0232727 A1 | 10/2006 | Yun et al. | |
| 2008/0049446 A1 | 2/2008 | Harbers et al. | |
| 2011/0187764 A1* | 8/2011 | Bae | G09G 5/10 345/697 |
| 2017/0059761 A1 | 3/2017 | Shim et al. | |

FOREIGN PATENT DOCUMENTS

| | | |
|---|---|---|
| JP | 2003-202565 A | 7/2003 |
| KR | 10-2013-0030105 A | 3/2013 |
| KR | 10-2014-0003097 A | 1/2014 |

\* cited by examiner

*Primary Examiner* — Euncha Cherry
(74) *Attorney, Agent, or Firm* — Sughrue Mion, PLLC

(57) ABSTRACT

A mirror display includes a light source, a light guide plate configured to guide light emitted from the light source, a first electrode layer spaced apart from the light guide plate and including at least one first hole, a first spacer provided between the light guide plate and the first electrode layer, a second electrode layer spaced apart from the first electrode layer and including at least one second hole not facing the first hole, and a substrate provided on the second electrode layer.

22 Claims, 19 Drawing Sheets

MIRROR DISPLAY AND METHOD OF MANUFACTURING THE SAME

CROSS-REFERENCE TO RELATED APPLICATION

This application claims priority from Korean Patent Application No. 10-2015-0134817, filed on Sep. 23, 2015, in the Korean Intellectual Property Office, the disclosure of which is incorporated herein in its entirety by reference.

BACKGROUND

1. Field

The exemplary embodiments relate to a mirror display and a method of manufacturing the mirror display.

2. Description of the Related Art

Light incident on mirrors may be delivered to users because mirrors reflect light. The reflectivity of mirrors is an optical property. Mirrors having high reflectivity may reflect a large portion of incident light toward users. However, mirrors having low reflectivity may reflect a relatively small portion of incident light toward users.

Displays have many pixels, and each pixel outputs light having a particular wavelength and a particular degree of intensity so that viewers may recognize images displayed on the displays.

Such mirrors and displays may be combined as mirror displays. Mirror displays may function as mirrors when displays are not operated. In addition, displays and mirrors of mirror displays may be used at the same time. An exemplary mirror display may be provided by combining a liquid crystal display with a transflective film. The transflective film may transmit images displayed on the liquid crystal display so that viewers may view the images, and may function as a mirror by reflecting a portion of incident light. However, the transflective film may decrease the light transmission efficiency of the liquid crystal display. Moreover, there may be a limit to increasing the reflectivity of the transflective film because of a trade-off relationship between reflection of incident light and transmission of images formed by the liquid crystal display.

SUMMARY

Exemplary embodiments may provide a mirror display including micro-optical switches.

Exemplary embodiments may provide a method of manufacturing a mirror display through simple processes.

Additional aspects will be set forth in part in the description which follows and, in part, will be apparent from the description, or may be learned by practice of the presented exemplary embodiments.

According to an aspect of an exemplary embodiment, a mirror display includes: a light source; a light guide plate configured to guide light emitted from the light source; a first electrode layer spaced apart from the light guide plate and including at least one first hole; a first spacer provided between the light guide plate and the first electrode layer; a second electrode layer spaced apart from the first electrode layer and including at least one second hole not facing the first hole; and a substrate provided on the second electrode layer.

in response to applying a voltage between the first electrode layer and the second electrode layer, the first electrode layer may be moved toward the second electrode layer.

In response to applying a voltage between the first electrode layer and the second electrode layer, the second electrode layer may not be moved.

In response to applying a voltage between the first electrode layer and the second electrode layer, the first electrode layer may close the second hole.

The substrate may include a transparent material.

The substrate may include a glass substrate.

The mirror display may further include an insulation layer provided on the second electrode layer.

The mirror display may further include an optical film covering the at least one second hole.

The optical film may include a diffusing plate or a polarizing plate to guide light in a predetermined direction.

The light source may include a plurality of light sources configured to emit light having different wavelengths.

The plurality of light sources may be turned on and off in a time sequence so as to display color images.

The mirror display may further include an image signal inputter configured to control light transmission by varying a time period during which a voltage is applied between the first electrode layer and the second electrode layer.

The substrate may be provided on a side of the second electrode layer through which light passing through the second hole is output.

The second electrode layer may have a reflectivity of 70% or greater.

The second electrode layer may reflect external light incident on the mirror display.

The mirror display may further include a gap formed between the light guide plate and the first electrode layer.

The mirror display may further include a second spacer provided between the first electrode layer and the second electrode layer.

The first electrode layer may include pixel electrodes, and the second electrode layer may include a common electrode.

According to an aspect of another exemplary embodiment, a method of manufacturing a mirror display includes: preparing a light guide plate; providing a first electrode layer on a substrate; etching the first electrode layer to form at least one first hole in the first electrode layer; providing a second electrode layer spaced apart from the first electrode layer; etching the second electrode layer to form at least one second hole in the second electrode layer; providing the second electrode layer to face the light guide plate; and coupling the second electrode layer to the light guide plate using a first spacer.

The method may further include: providing a first layer on the first electrode layer; etching the first layer to form a hole; forming a second spacer by filling the hole with a spacer material; providing the second electrode layer on the first layer; and removing the first layer.

The etching the second electrode layer may include etching the second electrode layer such that the second hole does not face the first hole.

The first electrode layer may have a reflectivity of 70% or greater.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
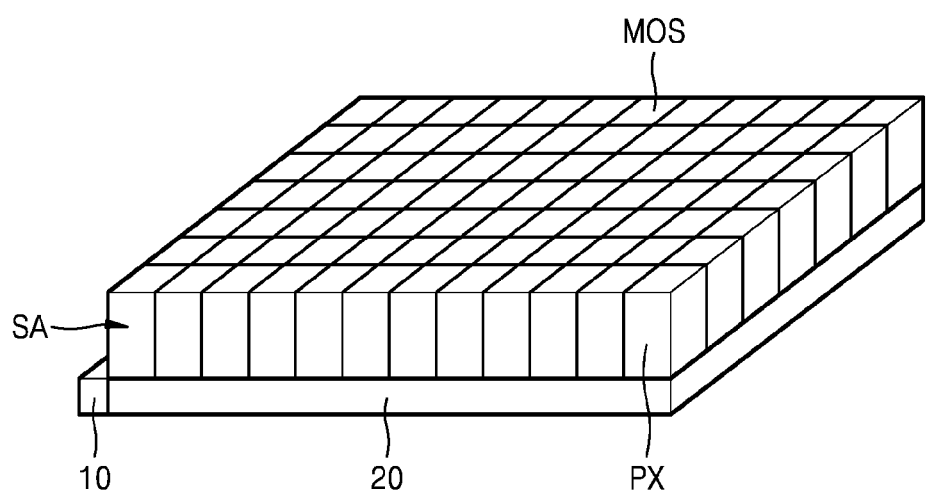
FIG. 1 is a schematic view illustrating a mirror display according to an exemplary embodiment.

Reference will now be made in detail to exemplary embodiments, examples of which are illustrated in the accompanying drawings. In this regard, the present exemplary embodiments may have different forms and should not be construed as being limited to the descriptions set forth herein. Accordingly, the exemplary embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

A mirror display and a method of manufacturing the mirror display will now be described with reference to the accompanying drawings according to exemplary embodiments.

In the drawings, like reference numbers refer to like elements, and the size of each element may be exaggerated for clarity of illustration. It will be understood that although the terms "first", "second", etc., may be used herein to describe various components, these components should not be limited by these terms. These terms are only used to distinguish one element from another.

As used herein, the singular forms "a," "an" and "the" are intended to include the plural forms as well, unless the context clearly indicates otherwise. It will be further understood that the terms "comprises," "comprising," "includes," and/or "including" as used herein specify the presence of stated features or elements, but do not preclude the presence or addition of one or more other features or elements.

In the description of the exemplary embodiments, terms such as units or modules are used to denote a unit having at least one function or performing at least one operation and implemented with hardware, software, or a combination of hardware and software. In addition, expressions such as "A is provided on B" may be construed that A is provided on B in a contact or non-contact manner.

FIG. 1 is a schematic view illustrating a mirror display according to an exemplary embodiment.

The mirror display may include a light source 10, a light guide plate 20 configured to guide light emitted from the light source 10, and a micro-optical switch array SA configured to transmit or block light incident from the light guide plate 20.

For example, the light source 10 may include a cold cathode fluorescent lamp (CCFL), a light emitting diode (LED), an organic light emitting diode (OLED), or a laser diode (LD). The light guide plate 20 transmits and reflects light emitted from the light source 10 such that the light may be uniformly transmitted from one side to the other side of the light guide plate 20.

For example, the light guide plate 20 may include a transparent material such as glass or a transparent plastic. The light guide plate 20 may be flat. However, the light guide plate 20 is not limited thereto. For example, the light guide plate 20 may have a wedge shape for improving light guiding efficiency and uniformity. The light source 10 may be disposed on one or more lateral sides of the light guide plate 20.

The micro-optical switch array SA may include a plurality of micro-optical switches MOS. For example, the micro-optical switches MOS may be arranged in a 2D matrix form. The micro-optical switches MOS may be independently turned on and off. The micro-optical switches MOS may be independently turned on and off by an electrical or mechanical method. For example, each of the micro-optical switches MOS may form a pixel PX of the mirror display. The amount of light transmission may be adjusted by controlling on and off times of the micro-optical switches MOS forming the pixels PX of the mirror display. That is, the micro-optical switch array SA may transmit light emitted from the light source 10 while individually adjusting the amount of light transmission through the pixels PX. If the light source 10 emits light having a plurality of wavelength bands, color images may be displayed on the mirror display. This will be further described later.

Figure 2:
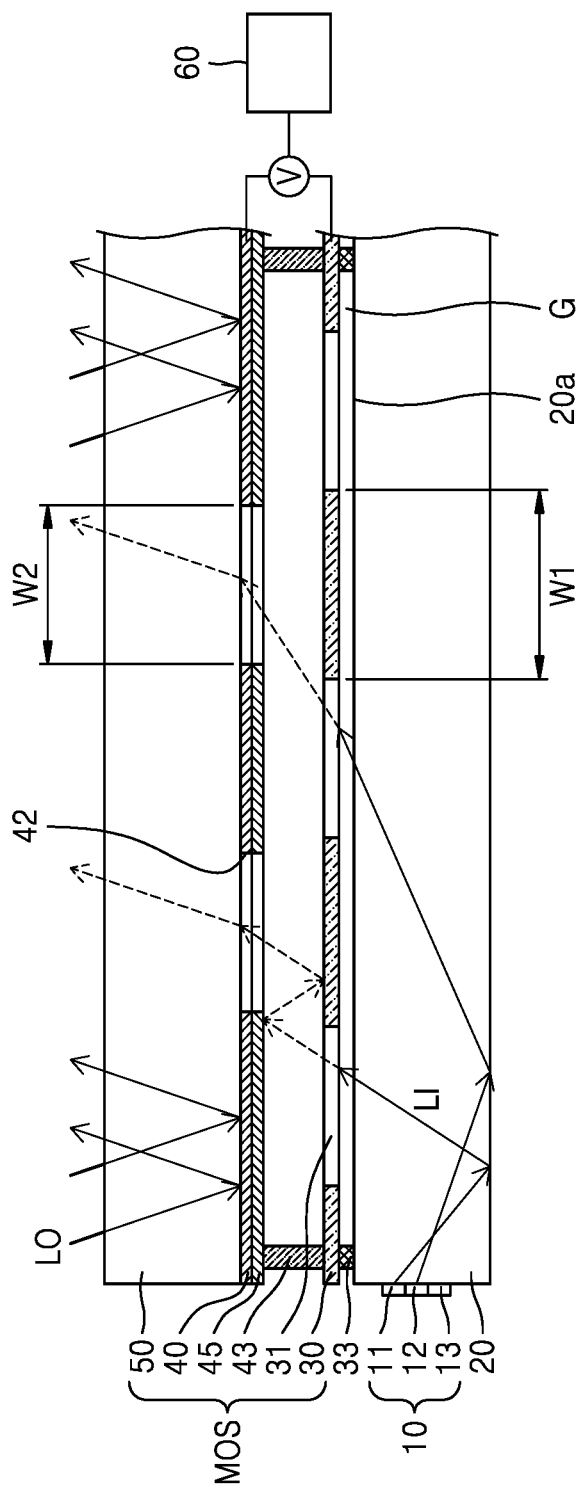
FIG. 2 is a partial cross-sectional view illustrating the mirror display according to an exemplary embodiment.
Figure 3:
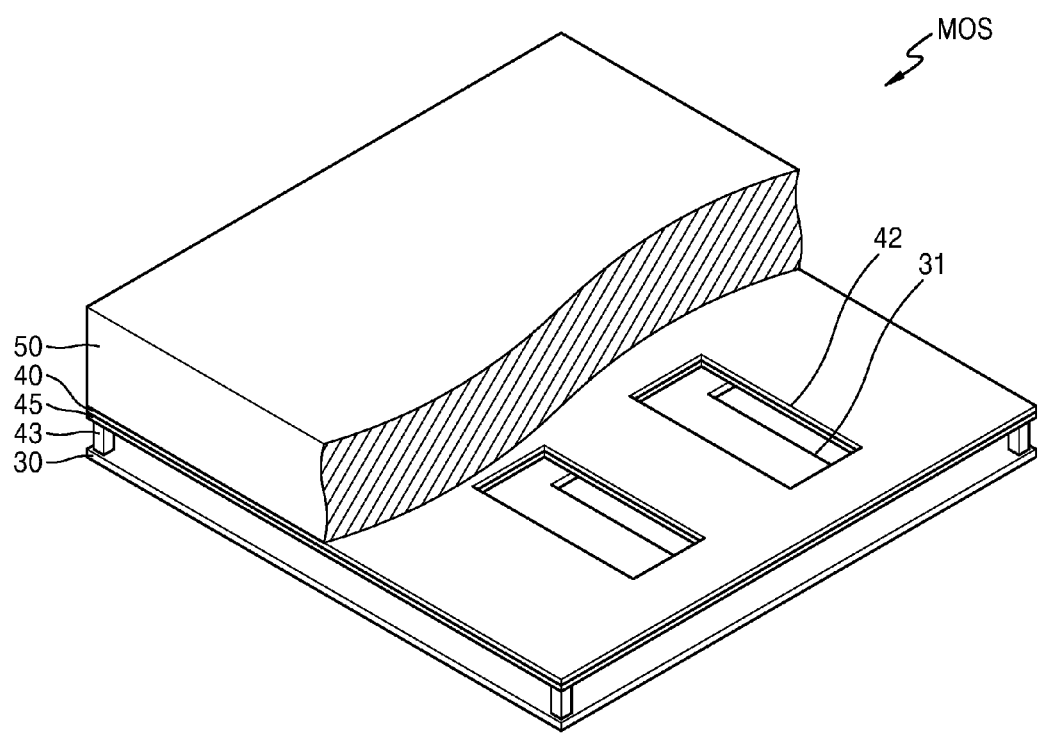
FIG. 3 is a cut-way view illustrating a micro-optical switch of the mirror display according to an exemplary embodiment.

FIG. 2 is a cross-sectional view illustrating one of the pixels PX of the mirror display depicted in FIG. 1, and FIG. 3 is a partial cut-away view illustrating one of the micro-optical switches MOS.

For example, the light source 10 may include a first light source 11, a second light source 12, and a third light source 13. The first light source 11, the second light source 12, and the third light source 13 may emit light having different wavelengths, respectively. For example, the first light source 11 may emit red light, the second light source 12 may emit green light, and the third light source 13 may emit blue light. For example, a plurality of first light sources 11, a plurality of second light sources 12, and a plurality of third light sources 13 may be provided. In this case, for example, the first light sources 11, the second light sources 12, and the third light sources 13 may be alternately arranged in rows on a lateral side of the light guide plate 20. FIG. 2 illustrates an example in which the first to third light sources 11 to 13 are arranged in a thickness direction of the light guide plate 20. However, the first to third light sources 11 to 13 are not limited thereto. In another example, the first to third light sources 11 to 13 may be arranged on a lateral side of the light guide plate 20 in a length direction of the light guide plate 20. The numbers and arrangement of the first to third light sources 11 to 13 may be varied by taking into account the brightness and optical efficiency of the light source 10. For example, since green light sources have optical efficiency lower than the optical efficiency of other light sources, more green light sources may be arranged. For example, light sources 10 may be disposed on opposing sides of the light guide plate 20.

The micro-optical switches MOS may be provided on an exit surface 20a of the light guide plate 20. Herein, the term "exit surface" refers to a surface through which light exits. The micro-optical switches MOS may be separate from the exit surface 20a of the light guide plate 20. To this end, a first spacer 33 may be provided between the light guide plate 20 and the micro-optical switches MOS. The micro-optical switches MOS may include: a first electrode layer 30 separate from the light guide plate 20; and a second electrode layer 40 separate (e.g., spaced apart) from the first electrode layer 30. A substrate 50 may be provided on the second electrode layer 40. The first spacer 33 may support the first electrode layer 30 such that the first electrode layer 30 may not be in contact with the light guide plate 20 and may appear to be suspended above the light guide plate 20. A gap G may be formed between the light guide plate 20 and the first electrode layer 30.

The first electrode layer 30 may include one or more first holes 31. The second electrode layer 40 may include one or more second holes 42. The first and second holes 31 and 42 may not face with each other. For example, as shown in FIG. 2, the first and second holes 31 and 42 may be arranged in zigzag in a horizontal direction such that the first and second holes 31 and 42 may not overlap each other. As the micro-optical switches MOS are turned on or off, the second holes 42 may be closed or opened. When no voltage is applied between the first and second electrode layers 30 and 40, the micro-optical switches MOS may be turned off, and in this case, light may pass through the first and second holes 31 and 42. When a voltage is applied between the first and second electrode layers 30 and 40, the micro-optical switches MOS may be turned on, and in this case, the second holes 42 may be closed to block light.

The shapes, sizes, and numbers of the first and second holes 31 and 42 may be variously selected as long as the first and second holes 31 and 42 do not overlap each other when the micro-optical switches MOS are turned on. For example, the first and second holes 31 and 42 may have various shapes such as quadrangular, circular, or diamond-like shapes. FIG. 3 illustrates an example in which the first and second holes 31 and 42 have a rectangular shape. For example, the first holes 31 may be arranged in a 2×2 form, and the second holes 42 may be arranged in a 3×2 form.

When the micro-optical switches MOS are turned on, the second holes 42 may be closed by the first electrode layer 30. For example, a width W1 between the first holes 31 of the first electrode layer 30 may be greater than the width W2 of the second holes 42.

For example, the first and second electrode layers 30 and 40 may be formed of an opaque conductive material. The opaque conductive material may include a light blocking material. For example, the first and second electrode layers 30 and 40 may include an opaque conductive material. The first and second electrode layers 30 and 40 may include at least one metal selected from titanium (Ti), gold (Au), silver (Ag), platinum (Pt), copper (Cu), aluminum (Al), nickel (Ni), and chromium (Cr). However, the first and second electrode layers 30 and 40 are not limited thereto.

An insulation layer 45 may be further provided on the second electrode layer 40. The insulation layer 45 may prevent a short circuit between the first and second electrode layers 30 and 40. In addition, reflective layers may be formed on surfaces of the first and second electrode layers 30 and 40. For example, a reflective layer may be provided between the first and second electrode layers 30 and 40 to increase reflectivity of light which is incident from the outside.

The first and second electrode layers 30 and 40 may be separate (e.g., spaced apart) from each other. A second spacer 43 may be provided between the first and second electrode layers 30 and 40 to support the second electrode layer 40. The second spacer 43 may maintain a gap between the first and second electrode layers 30 and 40. In addition, the second spacer 43 may support the first electrode layer 30 when the first electrode layer 30 moves toward the second electrode layer 40. The second spacer 43 may have a thickness suitable for smooth on-off switching of the micro-optical switches MOS. For example, if the first and second electrode layers 30 and 40 are too close, the first and second electrode layers 30 and 40 may come into contact with each other even though a voltage is not applied between the first and second electrode layers 30 and 40, and thus the micro-optical switches MOS may abnormally operate. Therefore, the first and second electrode layers 30 and 40 may be spaced apart from each other by a suitable distance. At least two second spacers 43 may be provided. For example, post-shaped second spacers 43 may be disposed at four corners between the first and second electrode layers 30 and 40. However, the exemplary embodiments are not limited thereto. For example, two second spacers 43 shaped like a sidewall may be disposed between the first and second electrode layers 30 and 40. For example, the second spacer 43 may include an elastic material. For example, the second spacer 43 may be formed of an elastic material. For example, the second spacer 43 may be formed of an elastic polymer. However, the second spacer 43 is not limited thereto. For example, the second spacer 43 may include a material such as silicone, polysiloxanes, polyurethanes, polysilicone-polyurethane, rubber, ethylene-vinyl acetate copolymers, phenolic nitrile rubber, styrene butadiene rubber, polyether-block-amides, polyolefins, or gels.

The substrate 50 provided on the second electrode layer 40 may be a transparent substrate. For example, the substrate 50 may be a glass or plastic substrate. The substrate 50 may be disposed on a side of the second electrode layer 40 through which light passing through the second holes 42 is output.

The first electrode layer 30 may have a very small thickness, for example, in the range of several nanometers to several tens of nanometers. The first electrode layer 30 having a very small thickness may be supported as if floating in air, and as the micro-optical switches MOS are turned on and off, the first electrode layer 30 may be moved. However, since the second electrode layer 40 is provided on the substrate 50, the second electrode layer 40 may have a higher degree of flatness than the first electrode layer 30 supported in air. Flatness may affect reflectivity. That is, a layer having a relatively high degree of flatness may have a relatively high reflectivity compared to a layer formed of the same material and having a relatively low degree of flatness. For example, the second electrode layer 40 may have a reflectivity of about 70% or greater. For example, the second electrode layer 40 may have a reflectivity of about 90% or greater. The second electrode layer 40 may have a higher degree of reflectivity with respect to external light than the first electrode layer 30. The second electrode layer 40 provided on the substrate 50 may be disposed on an outer side of the mirror display such that the second electrode layer 40 may function as a mirror. Here, the outer side may refer to an exit-surface side of the mirror display through which light forming an image is output.

As described above, the micro-optical switches MOS may be arranged on the light guide plate 20 in an array structure. The micro-optical switches MOS may be independently turned of and off by an electrical method. In addition, the micro-optical switches MOS may be independently moved by a mechanical method. That is, the micro-optical switches MOS may individually apply a voltage between the first and second electrode layers 30 and 40. To this end, the micro-optical switches MOS may include a driving circuit unit 60 for applying a voltage between the first and second electrode layers 30 and 40. The driving circuit unit 60 may include a passive matrix structure or an active matrix structure. For example, if the driving circuit unit 60 includes an active matrix structure, the micro-optical switches MOS may be turned on and off by well-known thin-film transistors. For example, the first electrode layer 30 may include pixel electrodes configured to individually apply a voltage to the pixels PX, and the second electrode layer 40 may include a common electrode. Alternatively, the first electrode layer 30 may include a common electrode, and the second electrode layer 40 may include pixel electrodes.

Figure 4:
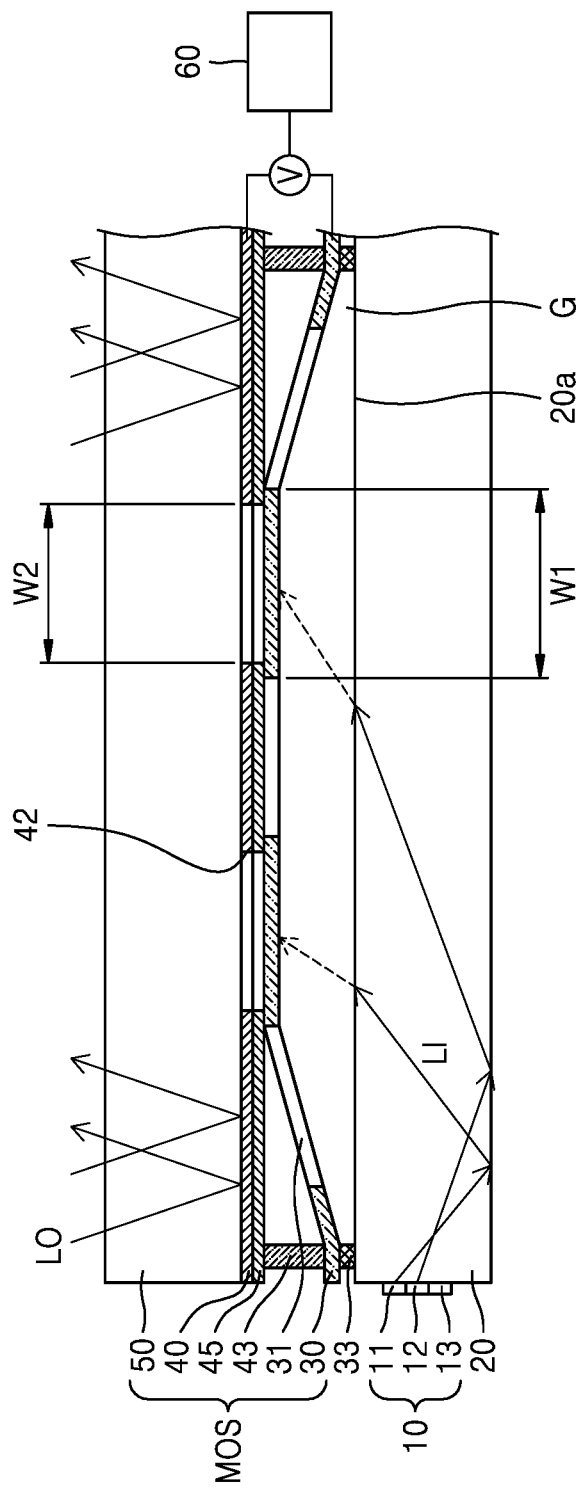
FIG. 4 is a view illustrating a turned-on micro-optical switch of the mirror display according to an exemplary embodiment.

With reference to FIGS. 2 and 4, an operation of the mirror display will now be described.

FIG. 2 illustrates a turned-off state of the micro-optical switch MOS. When no voltage is applied between the first and second electrode layers 30 and 40, the first and second electrode layers 30 and 40 stay in a separate state, and the first and second holes 31 and 42 stay in an opened state. At this time, light emitted from the light source 10 may propagate through the light guide plate 20 and may then exit through the first and second holes 31 and 42. Light L1 emitted from the light source 10 may be incident on the light guide plate 20, and a portion of the light L1 may be repeatedly reflected by upper and lower surfaces of the light guide plate 20 toward a side distant from the light source 10. Another portion of the light L1 may be reflected in the light guide plate 20 and may propagate toward the second electrode layer 40 through the first holes 31. Light incident on the second electrode layer 40 may be reflected back to the first electrode layer 30 and may be reflected again by the first electrode layer 30 such that the light may exit the mirror display through the second holes 42 and the substrate 50. Since the first and second electrode layers 30 and 40 include a reflective material, optical switching may be possible using the first and second electrode layers 30 and 40.

FIG. 4 illustrates a turned-on state of the micro-optical switch MOS. When a voltage is applied between the first and second electrode layers 30 and 40, the first electrode layer 30 may be pulled toward the second electrode layer 40 by an electrostatic attractive force. Since the second electrode layer 40 is fixed to the substrate 50 and the first electrode layer 30 is separate from the light guide plate 20, the first electrode layer 30 may be moved toward the second electrode layer 40. Thus, if the first electrode layer 30 is brought into contact with the second electrode layer 40, the second holes 42 may be closed by the first electrode layer 30. Then, since the second holes 42 are closed and the second electrode layer 40 includes an opaque reflective material, light may not be output through the second holes 42.

Figure 5:
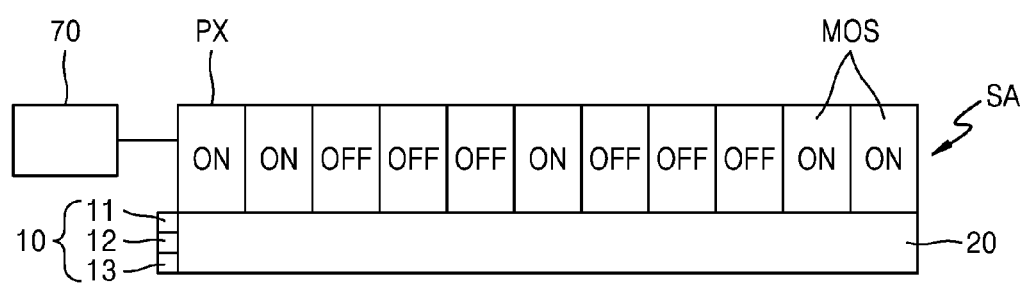
FIG. 5 is a view illustrating turning on and off of a micro-optical switch array of the mirror display according to an exemplary embodiment.

FIG. 5 illustrates a method of forming images by individually turning on or off the micro-optical switches MOS of the micro-optical switch array SA according to the pixel PX of the mirror display. The mirror display may further include an image signal input unit 70 configured to control the amount of light transmission by adjusting the time period during which a voltage is applied between the first and second electrode layers 30 and 40. In other words, the image signal input unit 70 may express the gray scale of images by individually adjusting time periods during which a voltage is applied to the micro-optical switches MOS. In addition, while the first to third light sources 11 to 13 configured to emit light having different wavelengths are operated in a time sequence, turning on and off of the micro-optical switches MOS may be controlled to display color images.

As described above, according to an exemplary embodiment, the mirror display may display color images without using a color filter.

In the above description, an image display operation of the mirror display is described. However, the mirror display may be used as a mirror as well as an image display. Referring to FIG. 2, light LO incident on the mirror display from the outside (hereinafter, also referred to as external light LO) may arrive at the second electrode layer 40 through the substrate 50. Since the second electrode layer 40 includes an opaque reflective material, the external light LO incident on the second electrode layer 40 may be reflected by the second electrode layer 40 to the outside. Therefore, when the micro-optical switches MOS are turned off, the mirror display may be used as a mirror owing to the second electrode layer 40. In addition, as shown in FIG. 4, when the micro-optical switches MOS are turned on, if external light LO is incident on the mirror display, the external light LO may be reflected by the first and second electrode layers 30 and 40 to the outside. Therefore, when the micro-optical switches MOS are turned on, the mirror display may be used as a mirror owing to the first and second electrode layers 30 and 40. The second electrode layer 40 may have a higher degree of reflectivity than the first electrode layer 30. Therefore, the second electrode layer 40 may function as a main mirror. That is, owing to the second electrode layer 40, the mirror display may function as a mirror independent of turning on or off of the micro-optical switches MOS.

As described above, the mirror display of an exemplary embodiment may function as an image display according to turning on and off of the micro-optical switches MOS. In addition, the mirror display may function as a mirror. When all the micro-optical switches MOS of the mirror display are turned on, the mirror display does not output light, and thus the mirror display may only function as a mirror.

Since the second electrode layer 40 reflecting external light LO is fixed to the substrate 50 when the micro-optical switches MOS are turned on and off, the second electrode layer 40 may maintain its reflectivity. Therefore, the mirror display of the exemplary embodiment may stably function as a mirror. In addition, although the second electrode layer 40 has a very thin thickness, since the second electrode layer 40 is stably attached to the substrate 50, the reflectivity of the second electrode layer 40 may be high. Therefore, the second electrode layer 40 may improve the mirror function of the mirror display without lowering the light transmission efficiency of the mirror display. For example, the second electrode layer 40 may have a reflectivity of about 70% or greater. For example, the second electrode layer 40 may have a reflectivity of about 90% or greater. In an exemplary embodiment, since light transmission is controlled using the micro-optical switches MOS without using liquid crystals, optical efficiency may be increased. Layers or structures such as a color filter or a translucent film may be necessary for displaying images using a liquid crystal layer. However, the mirror display of an exemplary embodiment does not use a color filter for displaying images and additional layers for functioning as a mirror. Therefore, the optical efficiency of the mirror display may be higher than that of liquid crystal displays.

Figure 6:
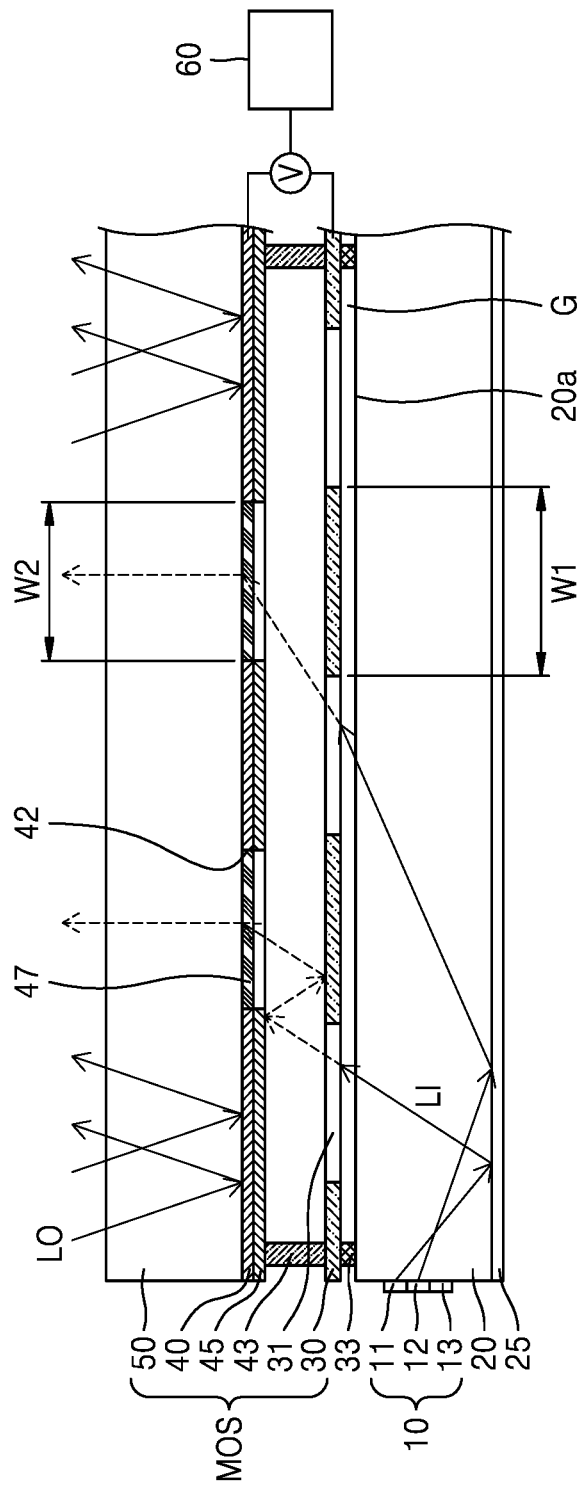
FIG. 6 illustrates an exemplary case in which the mirror display depicted in FIG. 2 further includes a light reflecting layer 25 and an optical film 47 according to an exemplary embodiment.

FIG. 6 illustrates an exemplary case in which the mirror display illustrated in FIG. 2 further includes a light reflecting layer 25 and an optical film 47. The light reflecting layer 25 may be disposed on a lower portion of the light guide plate 20. The light reflecting layer 25 reflects light that may leak through the lower portion of the light guide plate 20, and thus the light reflecting layer 25 may improve the optical efficiency of the mirror display.

For example, the optical film 47 may be disposed at positions corresponding to the second holes 42 to cover the second holes 42. The optical film 47 is transparent and capable of refracting light in an upward direction. For example, the optical film 47 may include a diffusing plate or a polarizing plate.

Figure 7:
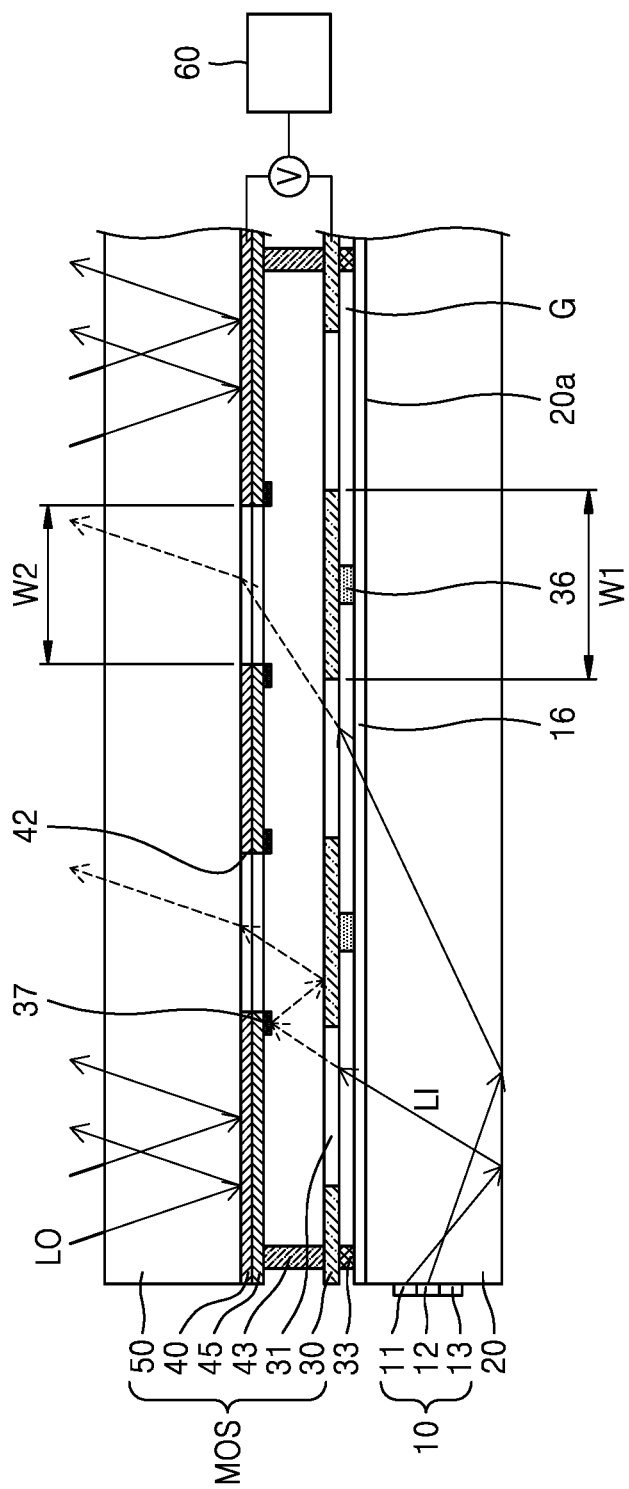
FIG. 7 illustrates an exemplary case in which the mirror display depicted in FIG. 2 further includes an anti-adhesion layer according to an exemplary embodiment.

FIG. 7 illustrates an exemplary case in which the mirror display illustrated in FIG. 2 further includes a light diffusing layer 16, a first anti-adhesion layer 36, and a second anti-adhesion layer 37.

The light diffusing layer 16 may be disposed on an exit surface of the light guide plate 20. The light diffusing layer 16 may diffuse light exiting from the light guide plate 20 such that the light may propagate in an upward direction. For example, the first anti-adhesion layer 36 may be provided between the light guide plate 20 and the first electrode layer 30. As shown in FIG. 7, the first anti-adhesion layer 36 may be provided between the light diffusing layer 16 and the first electrode layer 30. A very small gap G may be formed between the light guide plate 20 and the first electrode layer 30 or between the light diffusing layer 16 and the first electrode layer 30. Therefore, when the first electrode layer 30 is moved, the first electrode layer 30 may adhere to the light guide plate 20 or the light diffusing layer 16, and thus switching errors may occur. The first anti-adhesion layer 36 may reduce such switching errors.

The second anti-adhesion layer 37 may be provided on the second electrode layer 40 or the insulation layer 45. However, the second anti-adhesion layer 37 is not limited thereto. For example, the second anti-adhesion layer 37 may be provided on the first electrode layer 30. When the first electrode layer 30 is moved and brought into contact with the second electrode layer 40, the second anti-adhesion layer 37 may prevent the first electrode layer 30 from adhering to the second electrode layer 40. The second anti-adhesion layer 37 may be provided in some small regions of the second electrode layer 40.

Figure 8:
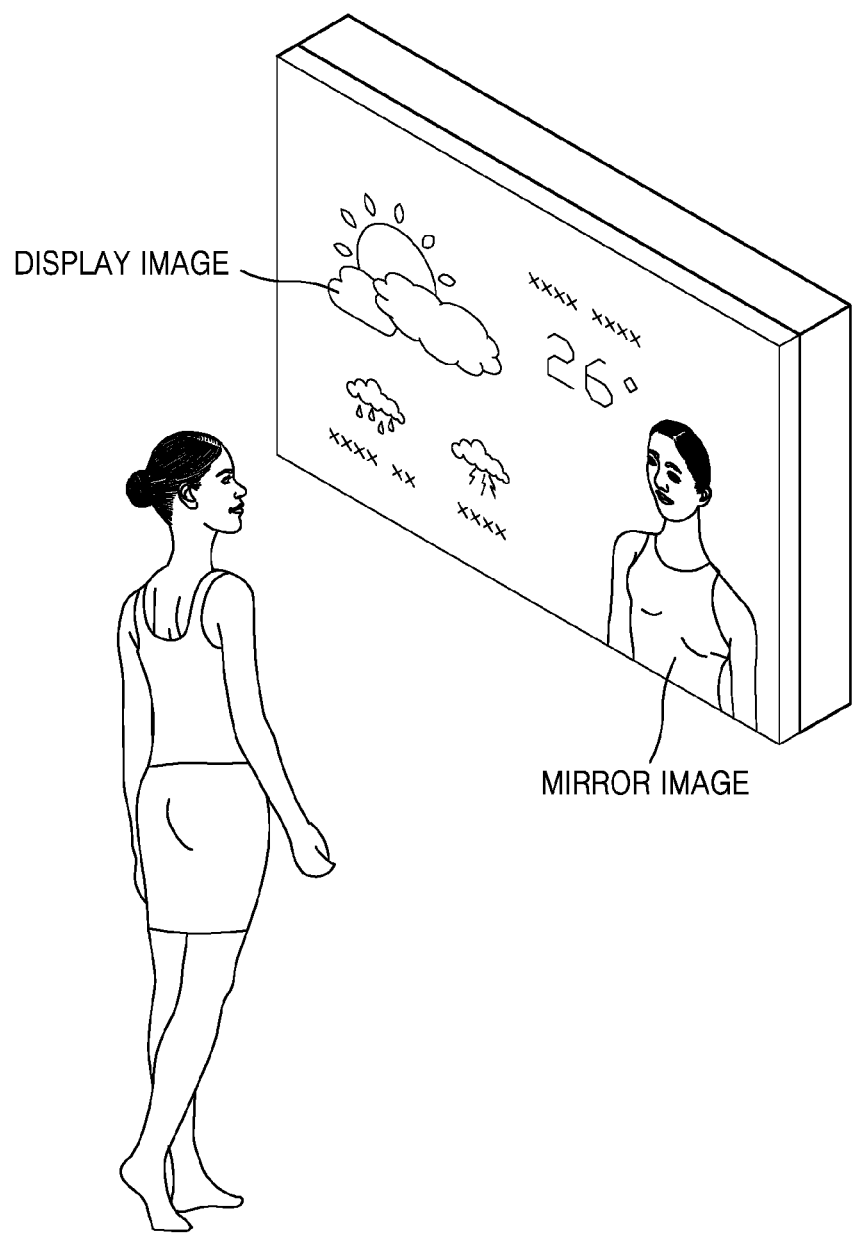
FIG. 8 is a view illustrating an exemplary usage of the mirror display according to an exemplary embodiment.

FIG. 8 illustrates an exemplary usage of the mirror display according to an exemplary embodiment. For example, the mirror display may be used as a substitute for a mirror in a bathroom. In a bathroom, the mirror display may function as a mirror and may provide a variety of information by displaying images. For example, the mirror display may display information such as date, weather, or temperature. In another example, the mirror display may be provided in a powder room, and images of clothes may be displayed on the mirror display so that users may look at themselves in the mirror display when dressing themselves. That is, the mirror display may be used as an augmented reality display. Furthermore, the mirror display may display information about a user's health. That is, the mirror display may be used as a healthcare display. Also, the mirror display may be used for various other purposes as well.

As described above in the exemplary embodiments, the mirror display has a simple structure, and thus the mirror display may easily be manufactured, for example, through semiconductor processes having high productivity. In addition, when the micro-optical switches MOS are turned on, the second holes 42 may be closed to prevent light leakage and improve the contrast of the mirror display. In addition, since the micro-optical switches MOS are turn on and off by the effect of electrostatic attractive force, the micro-optical switches MOS have a low operating voltage and a high operating speed. In addition, since total internal reflection is not required for the light guide plate 20, the light guide plate 20 may be manufactured with relatively low costs.

In addition, since the first and second electrode layers 30 and 40 for operating the micro-optical switches MOS are also used as mirrors, the mirror display does not need additional components for reflecting external light, and thus manufacturing costs of the mirror display may be reduced. Furthermore, according to the exemplary embodiments, the image display mode and mirror image display mode of the mirror display do not have a trade-off relationship, and thus the mirror display may have a high degree of optical efficiency in each of the modes.

Figure 9:
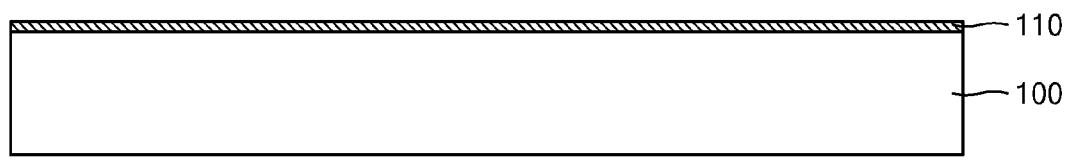
FIGS. 9, 10, 11, 12, 13, 14, 15, 16, 17, 18, and 19 are views illustrating a method of manufacturing a mirror display according to an exemplary embodiment.

Next, a method of manufacturing a mirror display according to an exemplary embodiment will be described. Referring to FIG. 9, a first electrode layer 110 may be disposed on a substrate 100. The substrate 100 may include a transparent material, and thus light may be transmitted through the substrate 100. For example, the substrate 100 may include glass. The first electrode layer 110 may include a conductive material having a light blocking ability. The first electrode layer 110 may include a light reflecting material. The first electrode layer 110 may include at least one of titanium (Ti), gold (Au), silver (Ag), platinum (Pt), copper (Cu), aluminum (Al), nickel (Ni), and chromium (Cr). However, the first electrode layer 110 is not limited thereto.

Figure 10:
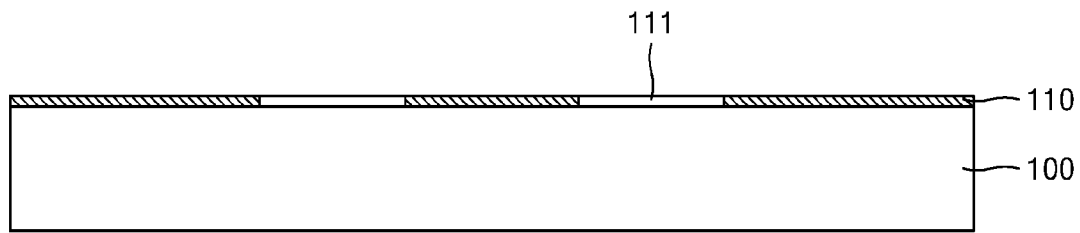
Figure 11:
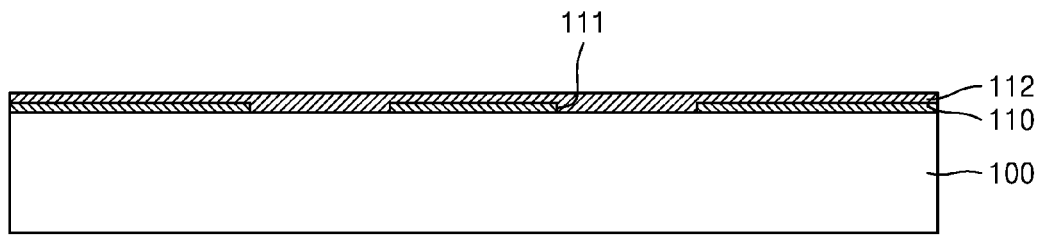
Figure 12:
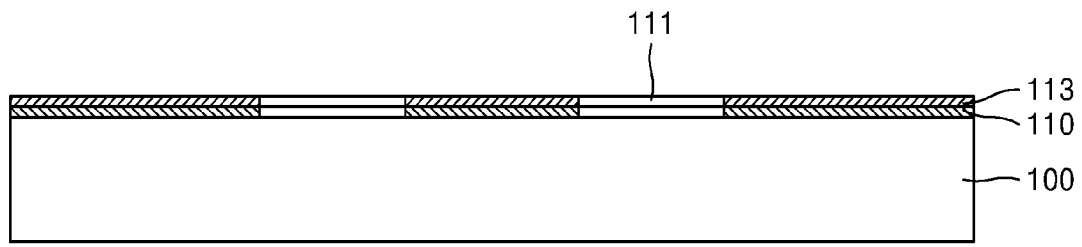

Referring to FIG. 10, the first electrode layer 110 may be patterned to form one or more first holes 111. Referring to FIG. 11, an insulative material layer 112 may be formed on the first electrode layer 110 including the first holes 111. Referring to FIG. 12, the insulative material layer 112 may be etched to form an insulation layer 113 corresponding to the first electrode layer 110. For example, the insulation layer 113 may include a light blocking material.

Figure 13:
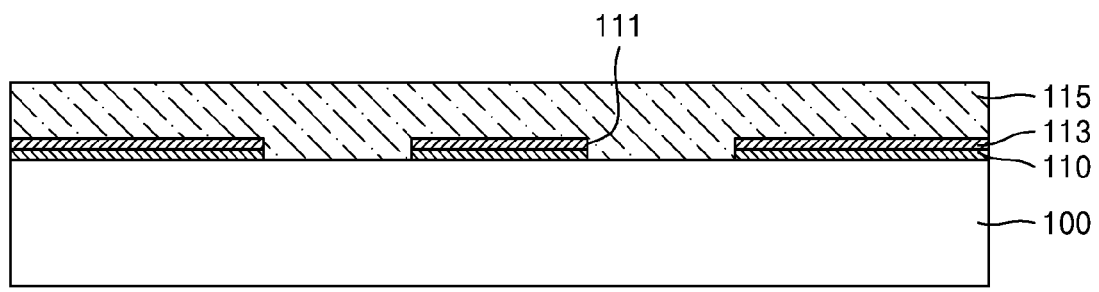
Figure 14:
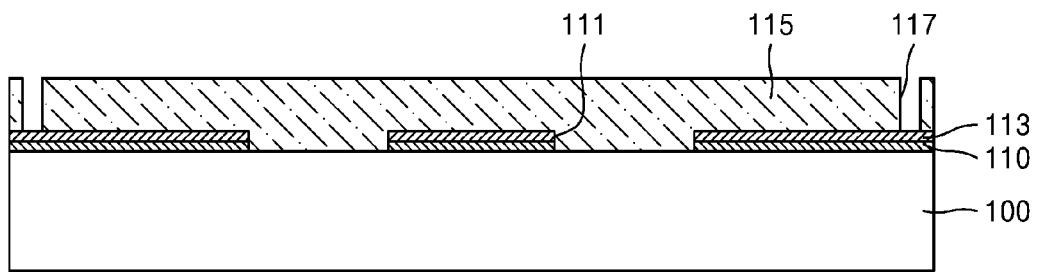
Figure 15:
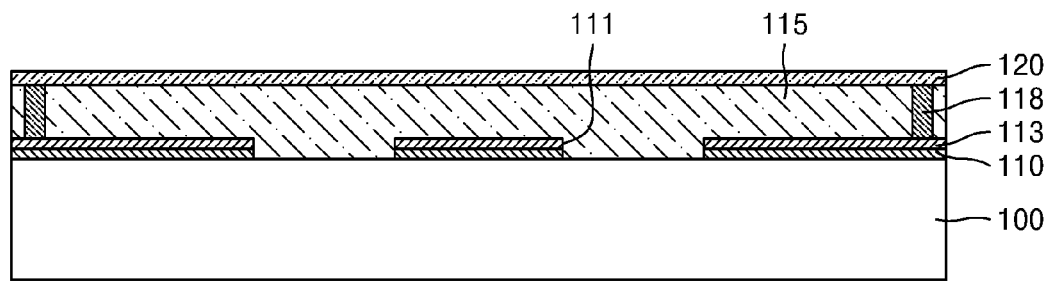

Referring to FIG. 13, a first layer 115 may be disposed on the insulation layer 113 and the substrate 100. The first layer 115 may be a sacrifice layer. Referring to FIG. 14, the first layer 115 may be etched to form holes 117. Referring to FIG. 15, a spacer material may be applied to fill the holes 117 and thus to form a first spacer 118. Next, a second electrode layer 120 may be disposed on the first layer 115. Since the second electrode layer 120 is disposed on the first layer 115 being a sacrifice layer, the flatness of the second electrode layer 120 may be low. Therefore, there may be a limit to increasing the reflectivity of the second electrode layer 120. However, since the first electrode layer 110 is disposed on the substrate 100, the first electrode layer 110 may have a higher degree of flatness than the second electrode layer 120. That is, the first electrode layer 110 may have a relatively high degree of reflectivity. For example, the first electrode layer 110 may have a reflectivity of about 70% or greater. For example, the first electrode layer 110 may have a reflectivity of about 90% or greater.

Also, instead of forming the first spacer 118 through a separate process as described above, the first spacer 118 may be formed together with the second electrode layer 120 by depositing the second electrode layer 120 on the structure shown in FIG. 14.

Figure 16:
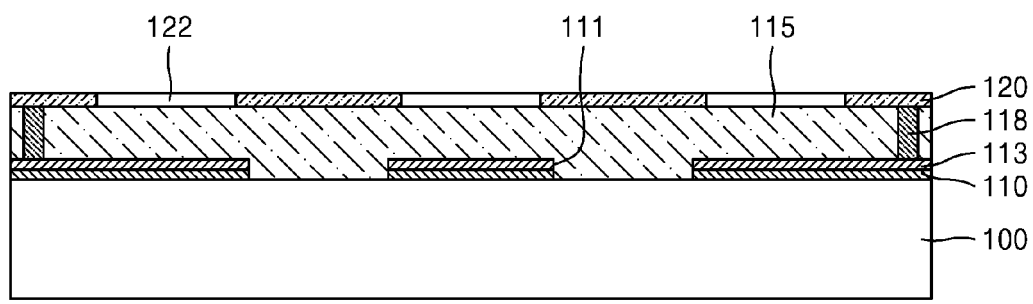
Figure 17:
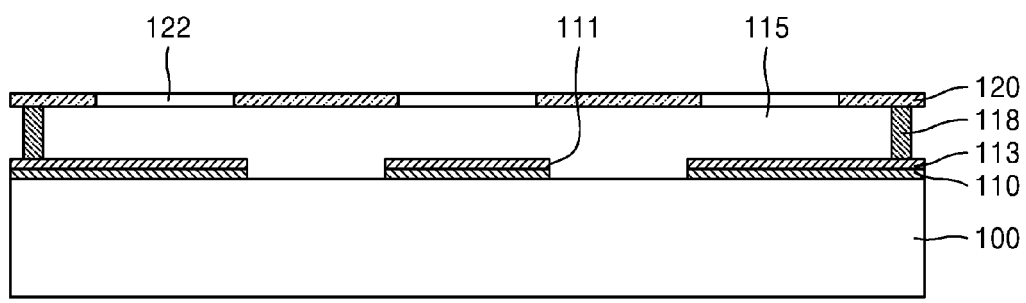

Referring to FIG. 16, the second electrode layer 120 may be etched to form second holes 122. Referring to FIG. 17, the first layer 115 may be removed using the second holes 122. For example, the first layer 115 may be removed through an ashing process.

Figure 18:
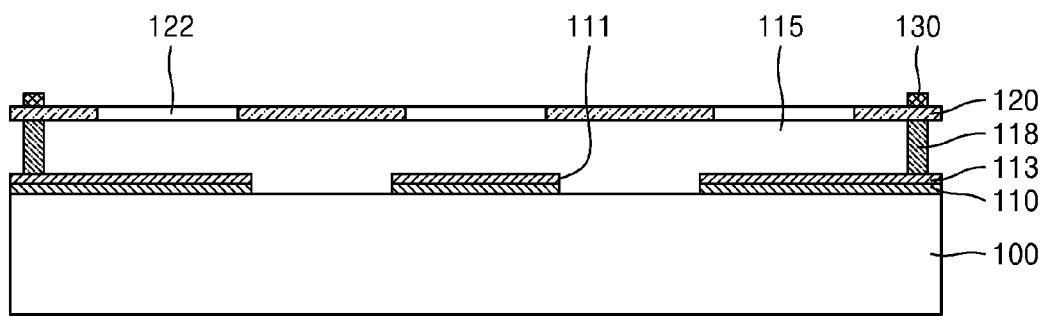

Referring to FIG. 18, before the first layer 115 is removed, a spacer material layer may be disposed on the structure shown in FIG. 16, and the spacer material layer may be etched to form a second spacer 130.

Figure 19:
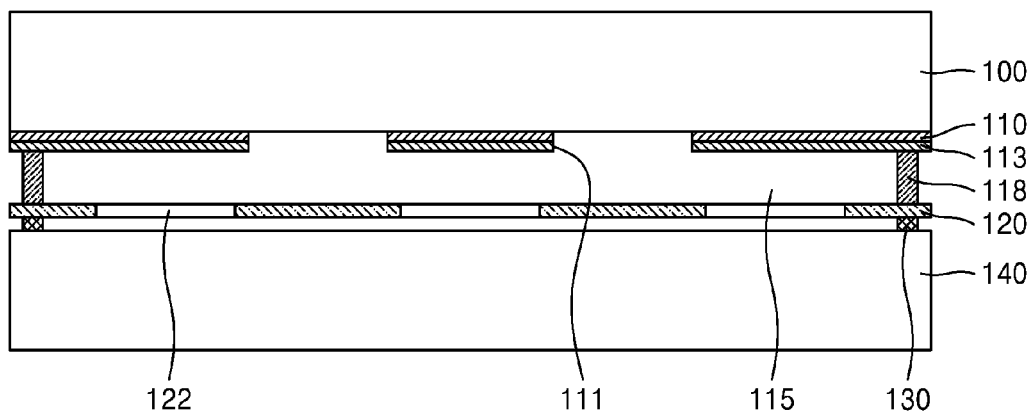

Referring to FIG. 19, the structure shown in FIG. 18 may be coupled to a light guide plate 140. When the structure shown in FIG. 18 is coupled to the light guide plate 140, the second electrode layer 120 may face the light guide plate 140. Then, the second electrode layer 120 and the light guide plate 140 may be coupled together with a predetermined gap being formed therebetween by the second spacer 130. In the above, the second spacer 130 is formed on the second electrode layer 120. In another example, however, the second spacer 130 may be formed on the light guide plate 140.

As described above, according to one or more of the above exemplary embodiments, the mirror display may be simply manufactured through semiconductor processes. The mirror display may be manufactured through micro-optical switch forming processes without having to perform an additional mirror forming process, and accordingly, the mirror display may be manufactured with low costs and high productivity.

As described above, according to one or more of the above exemplary embodiments, the optical reflectivity of the mirror display is increased using the micro-optical switches MOS, and thus the mirror display may function as a mirror without additional components. According to one or more of the above exemplary embodiments, the mirror display may display images using the micro-optical switches MOS without lowering the light transmission efficiency of the mirror display.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope of the exemplary embodiments as defined by the following claims.

What is claimed is:

1. A mirror display comprising:
   a light source;
   a light guide plate configured to guide light emitted from the light source;
   a first electrode layer spaced apart from the light guide plate and comprising at least one first hole;
   a first spacer provided between the light guide plate and the first electrode layer;
   a second electrode layer spaced apart from the first electrode layer and comprising at least one second hole not facing the first hole; and
   a substrate provided on the second electrode layer.

2. The mirror display of claim 1, wherein in response to applying a voltage between the first electrode layer and the second electrode layer, the first electrode layer is moved toward the second electrode layer.

3. The mirror display of claim 2, wherein in response to applying a voltage between the first electrode layer and the second electrode layer, the second electrode layer is not moved.

4. The mirror display of claim 1, wherein in response to applying a voltage between the first electrode layer and the second electrode layer, the first electrode layer closes the second hole.

5. The mirror display of claim 1, wherein the substrate comprises a transparent material.

6. The mirror display of claim 5, wherein the substrate comprises a glass substrate.

7. The mirror display of claim 1, further comprising an insulation layer provided on the second electrode layer.

8. The mirror display of claim 1, further comprising an optical film covering the at least one second hole.

9. The mirror display of claim 8, wherein the optical film comprises a diffusing plate or a polarizing plate to guide light in an upward direction.

10. The mirror display of claim 1, wherein the light source comprises a plurality of light sources configured to emit light having different wavelengths.

11. The mirror display of claim 10, wherein the plurality of light sources are turned on and off in a time sequence so as to display color images.

12. The mirror display of claim 1, further comprising an image signal inputter configured to control light transmission by varying a time period during which a voltage is applied between the first electrode layer and the second electrode layer.

13. The mirror display of claim 1, wherein the substrate is provided on a side of the second electrode layer through which light passing through the second hole is output.

14. The mirror display of claim 1, wherein the second electrode layer has a reflectivity of 70% or greater.

15. The mirror display of claim 1, wherein the second electrode layer reflects external light incident on the mirror display.

16. The mirror display of claim 1, further comprising a gap formed between the light guide plate and the first electrode layer.

17. The mirror display of claim 1, further comprising a second spacer provided between the first electrode layer and the second electrode layer.

18. The mirror display of claim 1, wherein the first electrode layer comprises pixel electrodes, and the second electrode layer comprises a common electrode.

19. A method of manufacturing a mirror display, the method comprising:
   preparing a light guide plate;
   providing a first electrode layer on a substrate;
   etching the first electrode layer to form at least one first hole in the first electrode layer;
   providing a second electrode layer spaced apart from the first electrode layer;
   etching the second electrode layer to form at least one second hole in the second electrode layer;
   providing the second electrode layer to face the light guide plate; and
   coupling the second electrode layer to the light guide plate using a first spacer.

20. The method of claim 19, further comprising:
   providing a first layer on the first electrode layer;
   etching the first layer to form a hole;
   forming a second spacer by filling the hole with a spacer material;
   providing the second electrode layer on the first layer; and
   removing the first layer.

21. The method of claim 19, wherein the etching the second electrode layer comprises etching the second electrode layer such that the second hole does not face the first hole.

22. The method of claim 19, wherein the first electrode layer has a reflectivity of 70% or greater.

\* \* \* \* \*